US009659322B2

(12) United States Patent
Gorjanc et al.

(10) Patent No.: US 9,659,322 B2
(45) Date of Patent: May 23, 2017

(54) GRAPHICAL DISPLAY FOR RECOMMENDING SLEEP COMFORT AND SUPPORT SYSTEMS

(71) Applicant: XSENSOR Technology Corporation, Calgary (CA)

(72) Inventors: Timothy C. Gorjanc, Calgary (CA); Stephen Anstey, Calgary (CA); Ian Main, Calgary (CA); Bruce Malkinson, Calgary (CA); Tyler Gill, Calgary (CA)

(73) Assignee: XSENSOR Technology Corporation, Calgary (CA)

( * ) Notice: Subject to any disclaimer, the term of this patent is extended or adjusted under 35 U.S.C. 154(b) by 477 days.

(21) Appl. No.: 13/753,466

(22) Filed: Jan. 29, 2013

(65) Prior Publication Data

US 2013/0144751 A1 Jun. 6, 2013

Related U.S. Application Data

(63) Continuation-in-part of application No. PCT/CA2011/000882, filed on Jul. 29, 2011.
(Continued)

(51) Int. Cl.
*G06Q 30/06* (2012.01)
*A47C 31/12* (2006.01)

(52) U.S. Cl.
CPC ....... *G06Q 30/0631* (2013.01); *A47C 31/123* (2013.01); *A47C 31/12* (2013.01)

(58) Field of Classification Search
CPC .... G06Q 30/0631; A47C 31/12; A47C 31/123
(Continued)

(56) References Cited

U.S. PATENT DOCUMENTS 2,378,039 A 6/1945 Schenker
2,804,129 A 8/1957 Propst
(Continued)

FOREIGN PATENT DOCUMENTS

AU 649391 9/1993
AU 48619/93 5/1994
(Continued)

OTHER PUBLICATIONS

Cork, Russel, "XSENSOR technology: A pressure imaging overview", Published in Sensor Review on 27.1 (2007): 24.; extracted for PQ dialog search on May 11, 2015.*
(Continued)

*Primary Examiner* — Yosesh C Garg
(74) *Attorney, Agent, or Firm* — Fenwick & West LLP

(57) ABSTRACT

A pressure sensor measures the surface pressure distribution of a body supported by a surface, for example a person lying on a mattress. In one approach, a pressure mapping system acquires a customer's pressure map using a reference mattress and presents this pressure data in the form of a pressure map. The pressure map measurement data is then analyzed to determine body characterizing parameters such as body mass index, contact area and average peak pressure. The pressure map measurements are then located on a mattress category grid that has been referenced and aligned to a large population sample of measurements taken with a reference mattress. Alternatively, the pressure map measurements are matched to a physical profile category within a database. Each category provides ranked mattress recommendations based on selection and ranking criteria derived from pressure map data obtained from a large sample of test subjects. In this way, a customer's pressure map can be translated to a recommendation of specific mattresses or mattress categories that are offered by a mattress retailer or manufacturer.

26 Claims, 14 Drawing Sheets
(10 of 14 Drawing Sheet(s) Filed in Color)

Related U.S. Application Data

(60) Provisional application No. 61/739,617, filed on Dec. 19, 2012, provisional application No. 61/369,167, filed on Jul. 30, 2010.

(58) Field of Classification Search
USPC .............................................. 705/26.1, 27.1
See application file for complete search history.

(56) References Cited

U.S. PATENT DOCUMENTS

| | | | |
|---|---|---|---|
| 2,976,725 A | 3/1961 | Beyer | |
| 3,100,992 A | 8/1963 | Davis | |
| 3,195,347 A | 7/1965 | Janapol | |
| 3,334,517 A | 8/1967 | Janapol | |
| 3,413,849 A | 12/1968 | Luederitz | |
| 4,134,063 A | 1/1979 | Nicol et al. | |
| 4,662,012 A | 5/1987 | Torbet | |
| 4,827,763 A | 5/1989 | Bourland et al. | |
| 5,010,772 A | 4/1991 | Bourland et al. | |
| 5,148,706 A | 9/1992 | Masuda et al. | |
| 5,231,717 A | 8/1993 | Scott et al. | |
| 5,487,196 A | 1/1996 | Wilkinson et al. | |
| 5,745,940 A | 5/1998 | Roberts et al. | |
| 5,815,865 A | 10/1998 | Washburn et al. | |
| 5,848,450 A | 12/1998 | Oexman et al. | |
| 5,963,997 A | 10/1999 | Hagopian | |
| 5,970,789 A * | 10/1999 | Meyer .................. | A47C 31/123 73/172 |
| 5,993,400 A | 11/1999 | Rincoe et al. | |
| 6,192,538 B1 | 2/2001 | Fogel | |
| 6,585,328 B1 | 7/2003 | Oexman et al. | |
| 7,467,058 B2 | 12/2008 | Boyd | |
| 7,937,239 B2 * | 5/2011 | Boyd ............................ | 702/127 |
| 8,458,042 B1 * | 6/2013 | Roberts et al. .............. | 705/26.1 |
| 2008/0062176 A1 * | 3/2008 | Arya .............................. | 345/440 |
| 2008/0201856 A1 | 8/2008 | Howard | |
| 2009/0216466 A1 | 8/2009 | Altman et al. | |
| 2009/0240514 A1 * | 9/2009 | Oexman et al. .................. | 705/1 |

FOREIGN PATENT DOCUMENTS

| | | |
|---|---|---|
| FR | 2720622 A1 | 12/1995 |
| JP | H 04-325116 A | 11/1992 |
| WO | WO 2013/085785 A1 | 6/2013 |

OTHER PUBLICATIONS

Gignac, Tamara; "Xsensor's body maps guide manufacturers: Pressure-point technology has manyapplications"; [Final Edition] Publication info: Calgary Herald [Calgary, Alta] Mar. 13, 2006: B8.*
Australian First Examination Report, Australian Application No. 2013200485, Jan. 30, 2015, 5 pages.
PCT International Search Report, PCT Application No. PCT/CA2011/000882, Nov. 10, 2011, 3 pages.
PCT International Written Opinion, PCT Application No. PCT/CA2011/000882, Nov. 10, 2011, 5 pages.
Ergocheck Measuring System, 1994 Ergocheck v.2.0 Reference Manual, 105 pages.
Telefax from A. Ahrens to L. Larson, Mar. 14, 1995, 1 page.
Park, S.J. et al., "Measurement and Analysis of Pressure Distribution on the Bed," Proceedings of the Human Factors and Ergonomics Society 39th Annual Meeting, 1995, pp. 297-300.
Nicol, K. et al., "Pressure Distribution on Mattresses," Journal of Biomechanics, 1993, pp. 1479-1486, vol. 26, No. 12.
Zabel, M., "Buying Mattresses for Comfort," University of Minnesota, 1969, 15 pages.
Chiradejnant, A., The Study of the Reliability and Validity of the Ergocheck Measurement System, School of Physiotherapy, University of South Australia, 1998. 74 pages.
Krouskop, T.A. et al., "Factors Affecting the Pressure-Distributing Properties of Foam Mattress Overlays," Journal of Rehabilitation Research and Development, Jul. 1986, pp. 33-39, vol. 23, No. 3.
Reynolds, A. et al., Pressure-Reducing Capability of Conforma II Mattress Overlay, Advances in Wound Care, Jul. 1994, pp. 36-40, vol. 7, No. 4.
Shelton, et al., Full-Body Interface Pressure Testing as a Method for Performance Evaluation of Clinical Support Surfaces, Applied Ergonomics, 1998, pp. 491-497, vol. 29, No. 6.
"Force Sensing Array Version 3.1 User Manual," 2 ed., Vista Medical Ltd., 1996, 66 pages.
Talley Pressure Monitor 3, Operating Manual 1st Ed. Preliminary (received by the Food and Drug Administration on Dec. 9, 1991), 44 pages.
Oxford Pressure Monitor, Operating Instructions (received by the Food and Drug Administration on Dec. 9, 1991), 32 pages.
A Good Mattress is a Dream Come True, New York Times News Service, Mar. 29, 1998, 1 page, available at http://articles.chicagotribune.com/1998-03-29/news/9803290437_1_mattress-sleep-wake-disorder-center-bed.
Brienza, et al., A Method for Custom-Contoured Cushion Design Using Interface Pressure Measurements, IEEE Transactions on Rehabilitation Engineering, Mar. 1999, pp. 99-108, vol. 7, No. 1.
Harstall, C., "Interface Pressure Measurement Systems for Management of Pressure Sores," Alberta Heritage Foundation for Medical Research, Sep. 1996, 21 pages.
Brienza, et al., Seat Cushion Optimization: a Comparison of Interface Pressure and Tissue Stiffness Characteristics for Spinal Cord Injured and Elderly Patients, vol. 79, Archives of Physical Medicine & Rehabilitation, Apr. 1998, pp. 388-394, vol. 79.
Barhyte, et al., Selection of a Standard Hospital Mattress: Data-Based Decision Making, vol. 22, No. 6 Journal of Wound Ostomy & Continence Nursing, Nov. 1995, pp. 267-270, vol. 22, No. 6.
Malacaria, C., A Thin, Flexible, Matrix-Based Pressure Sensor, Sensors Magazine, Sep. 1998, 5 pages.
Rithalia, S. V.S. et al., "Assessment of Alternating Air Mattresses Using a Time-Based Interface Pressure Threshold Technique," Journal of Rehabilitation Research and Development, Jun. 1998, pp. 225-230, vol. 35 No. 2.
Kreutz, D., Computerized Pressure Mapping, Advance for Directors in Rehabilitation, Nov. 11-12, 1997, 3 pages.
Reswick, J.B. et al., Experience at Rancho Los Amigos Hospital with Devices and Techniques to Prevent Pressure Sores, in Bedsore Biomechanics 301, 307-08 (University Park Press 1976).
Clark, M., "Comparison of the Pressure Redistributing Attributes of a Selection of Bed Mattresses Used to Prevent Pressure Sores," The Journal of Tissue Viability, Jul. 1991, pp. 65-67, vol. 1 No. 3.
Defloor, T. et al., "Sitting Posture and Prevention of Pressure Ulcers," Applied Nursing Research, Aug. 1999, pp. 137-142, vol. 12 No. 3.
Lipka, D., "An Overview of Pressure-Mapping System," Technology Special Interest Section Quarterly, Dec. 1997, pp. 1-6, vol. 7 No. 4.
Australian Second Examination Report, Australian Application No. 2013200485, Feb. 9, 2016, 3 pages.
Ergocheck Brochure: Ergocheck Fulfils One of the Essential Demands of the Bedding Trade, ABW, 1994, 3 pages.

* cited by examiner

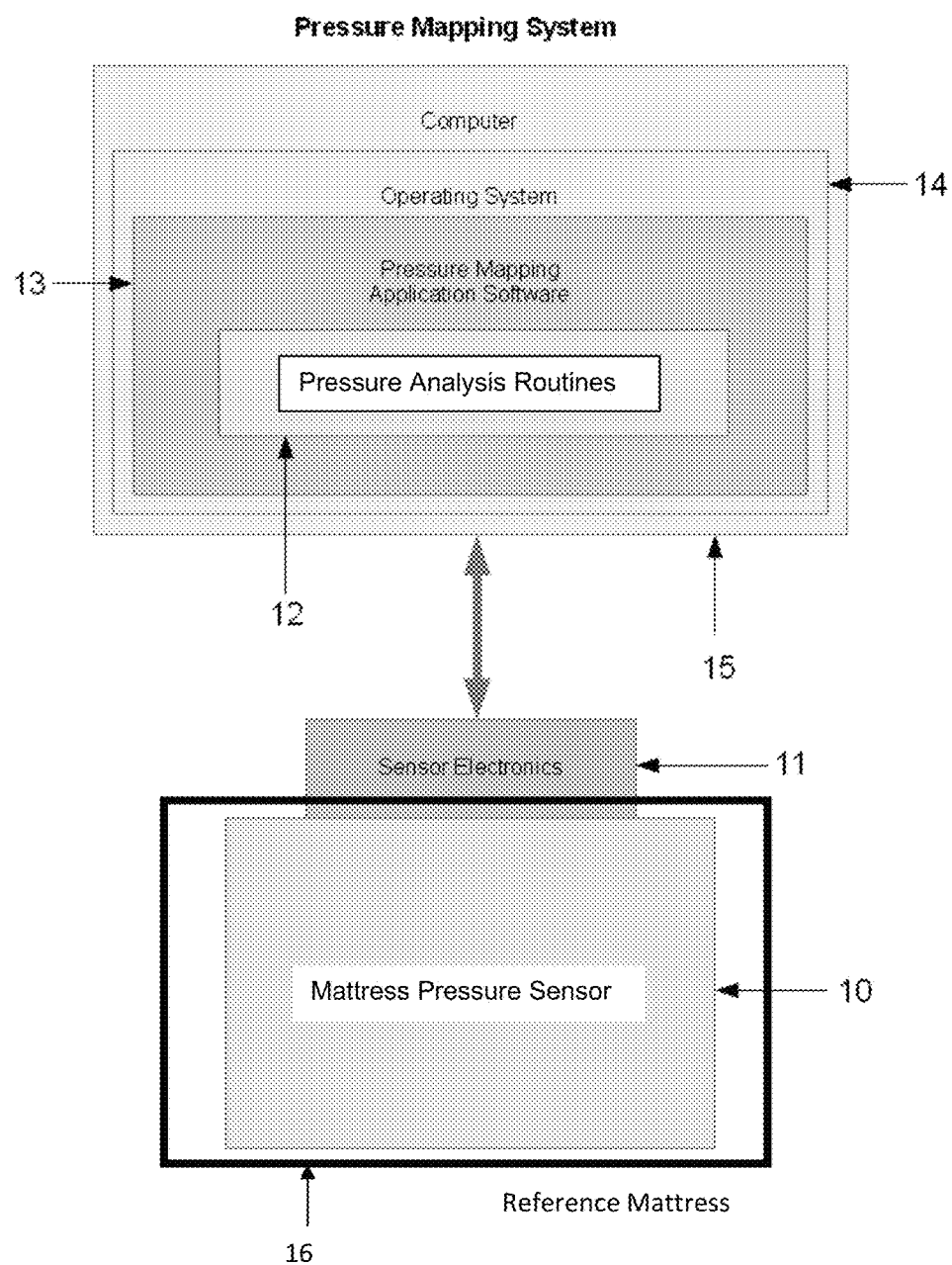
Figure 1 Pressure Mapping System for Mattress Recommendation

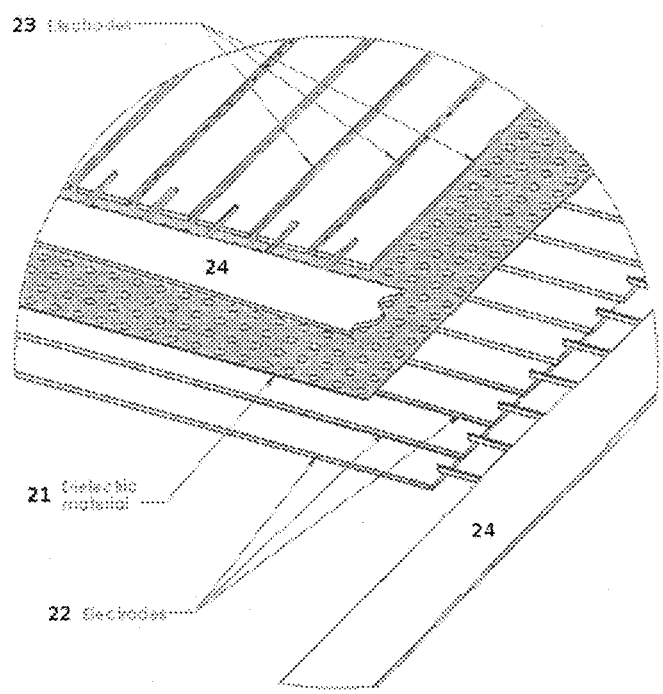
Figure 2 Capacitive Pressure Sensor Construction

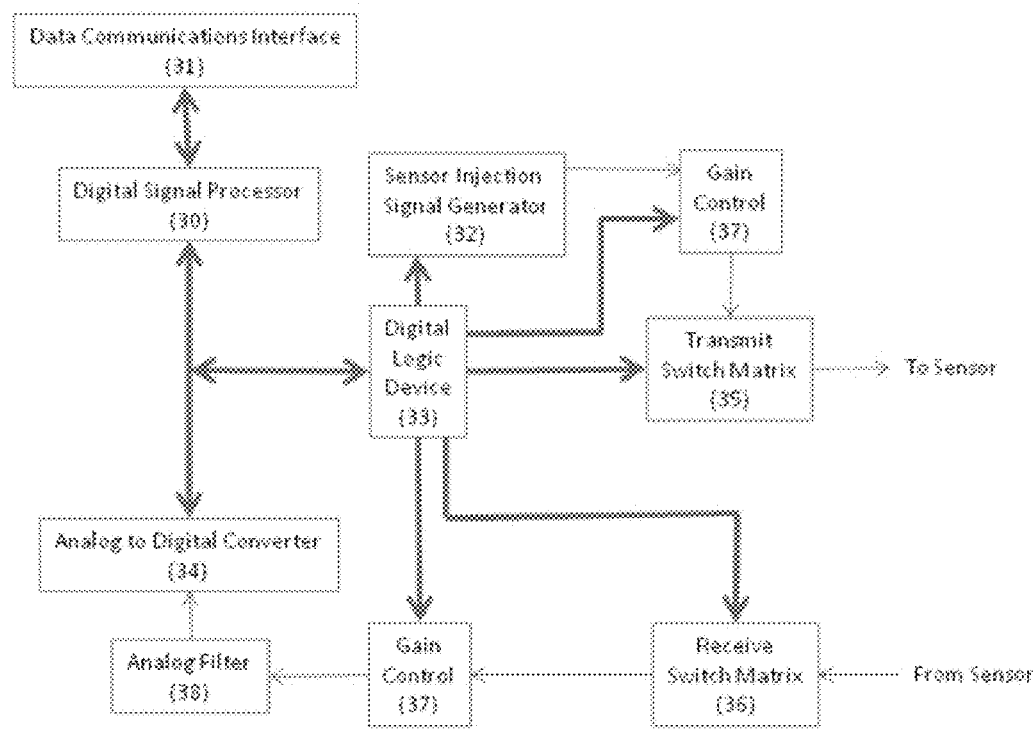
Figure 3 Sensor Electronics Block Diagram
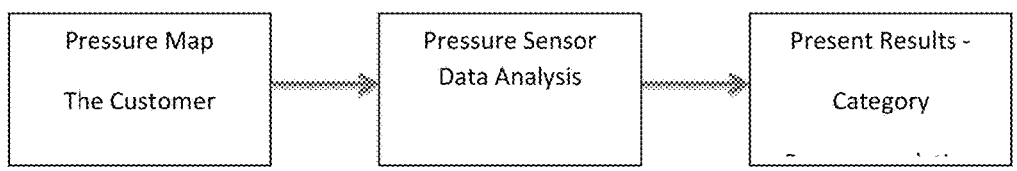
Figure 4 Mattress Category Recommend Process

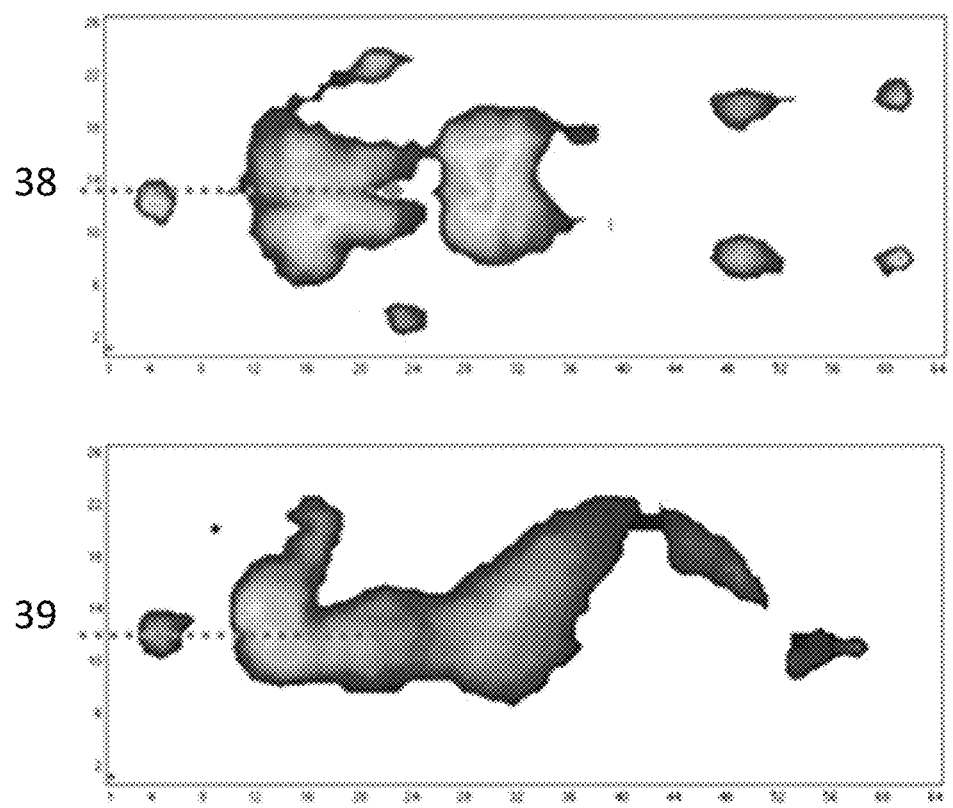
Figure 5 Pressure Map Back and Side

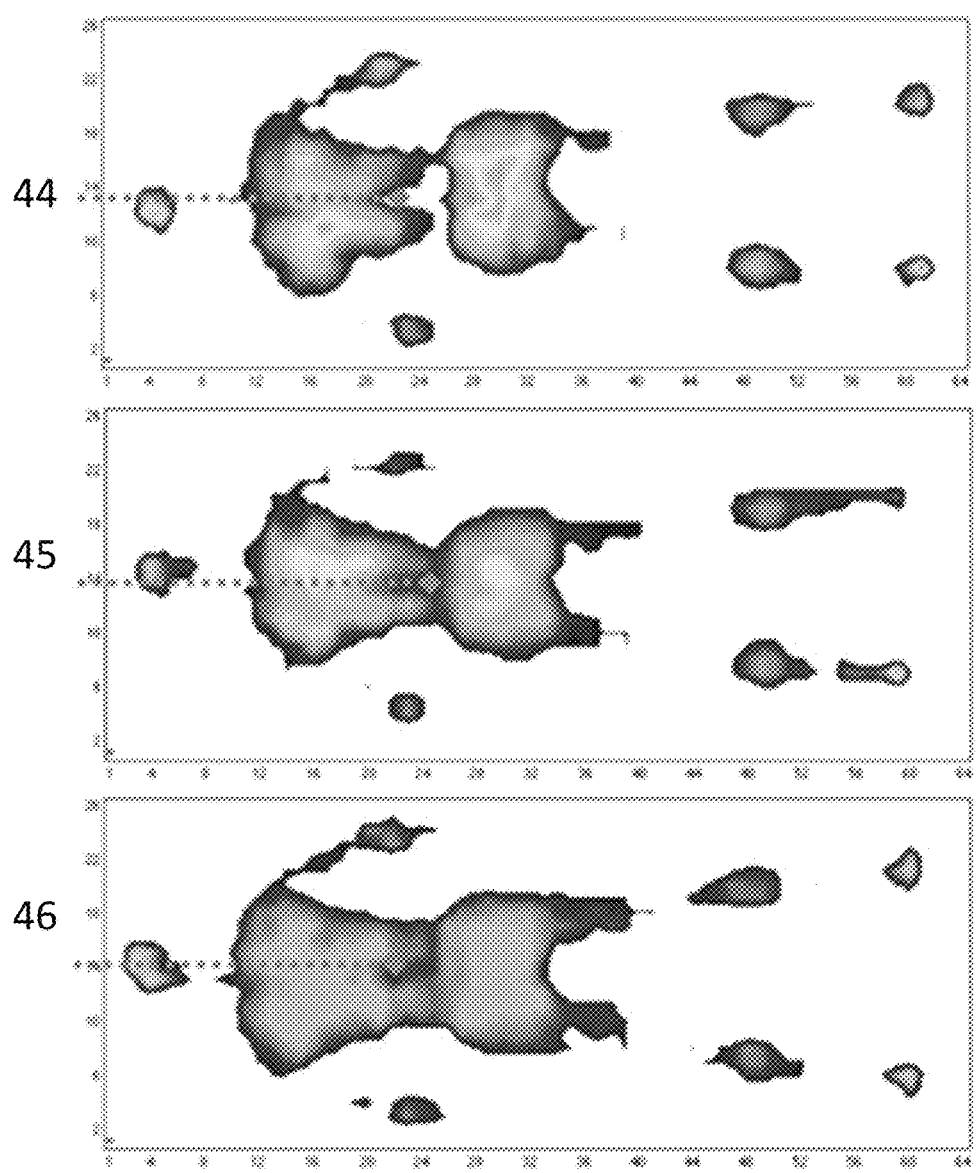
Figure 6 Pressure Map with Decreasing Surface Firmness

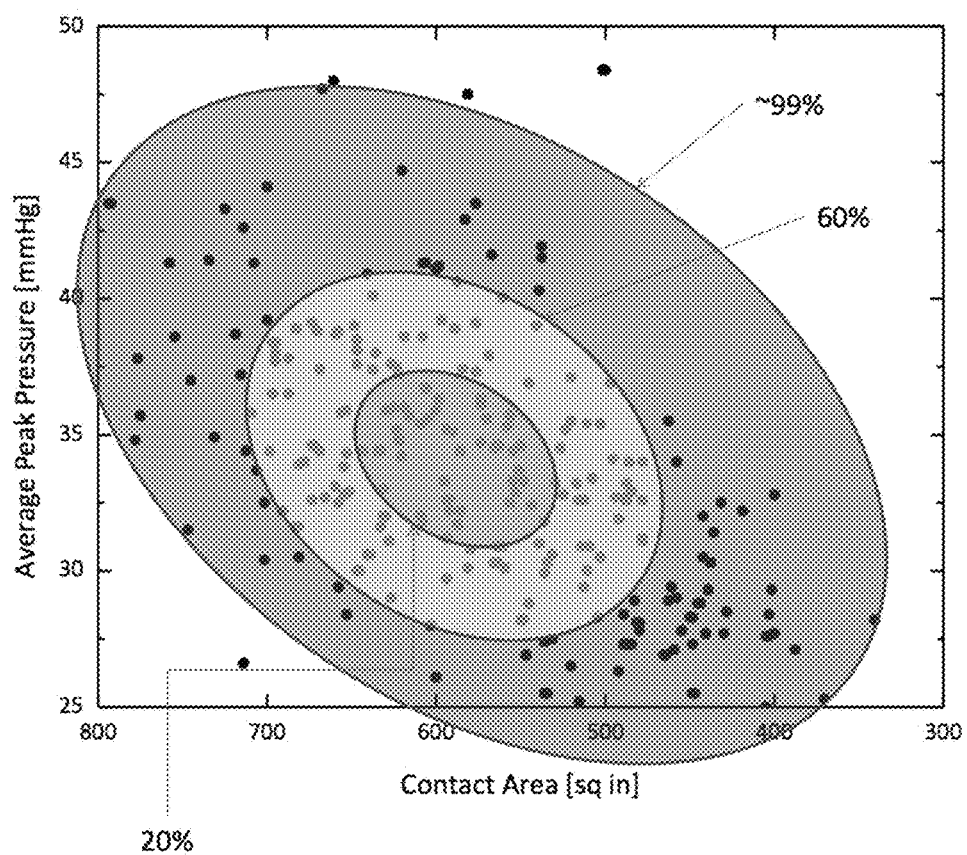
Figure 7 Customer Reference Data From a Reference Mattress

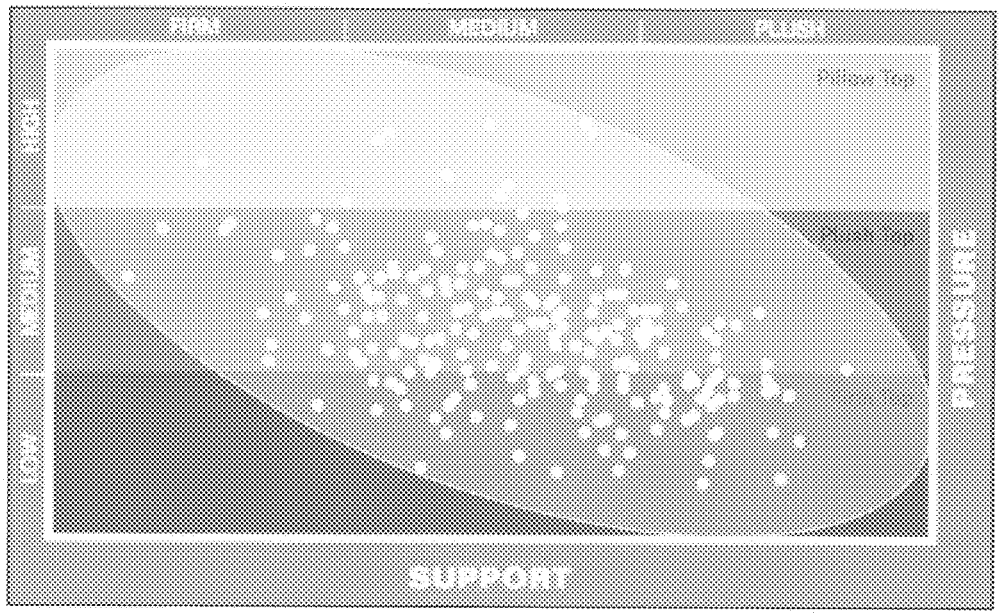
Figure 8 Data Samples Framed With Recommend Categories
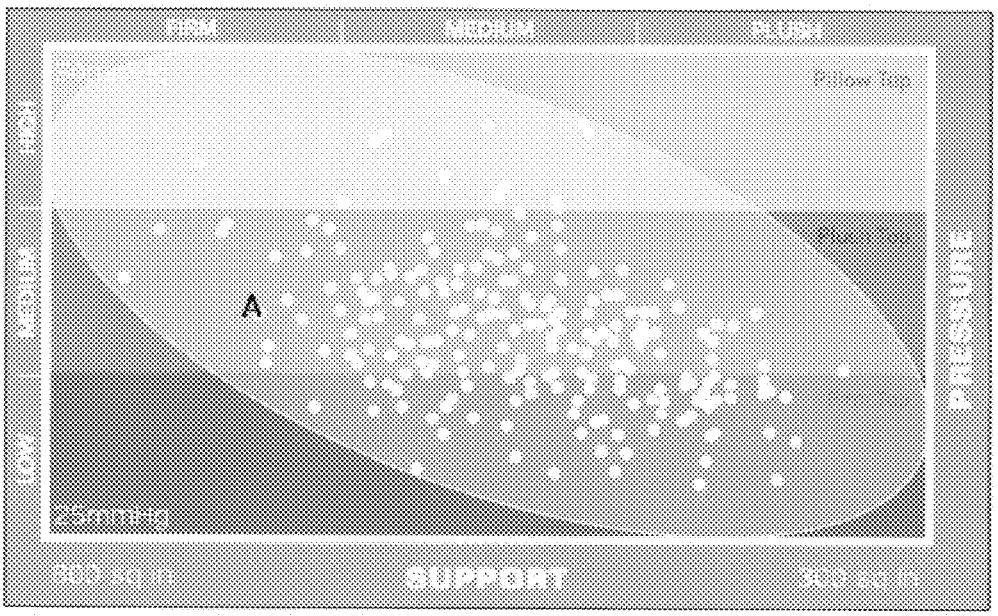
Figure 9 Customer "A" Located In Recommend Categories

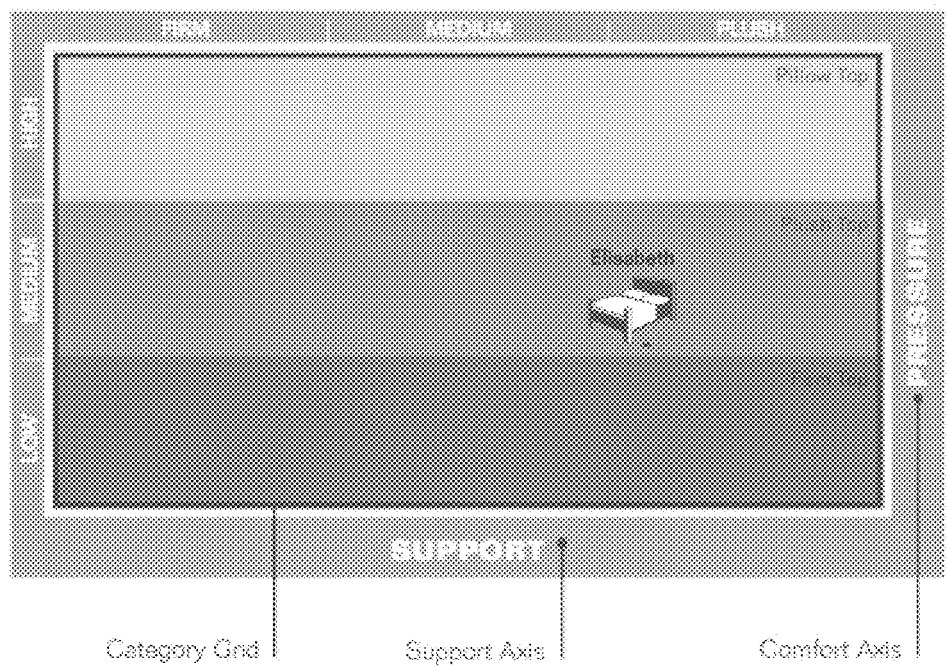
Figure 10 Category Recommend Results

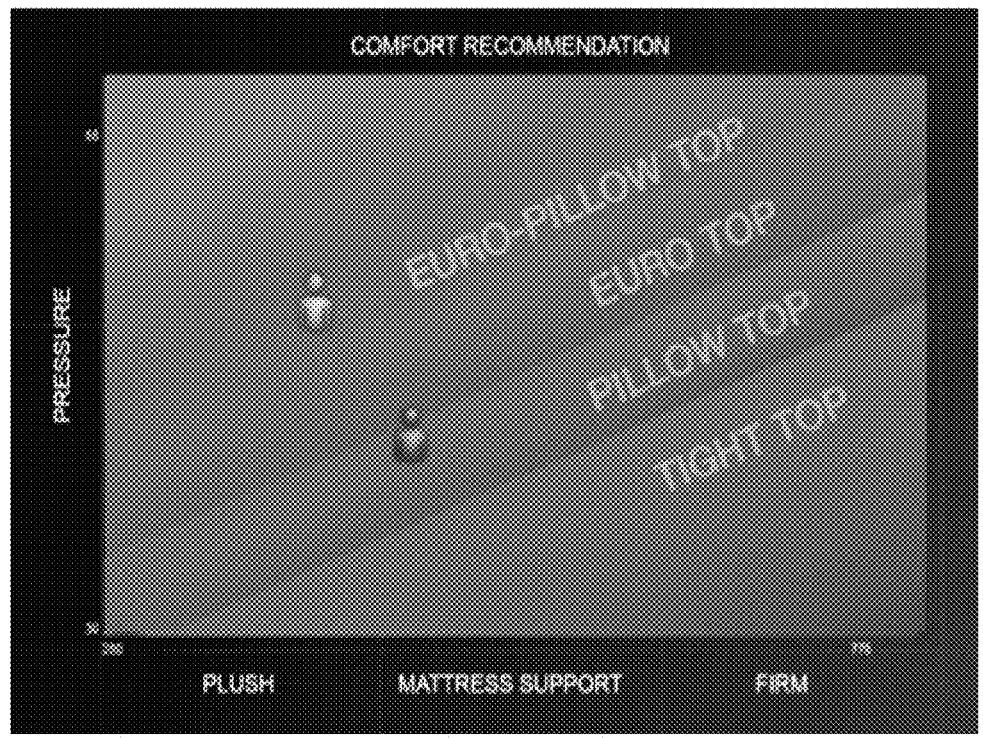
Figure 11a Two Mattress Categories and Four Topper Categories
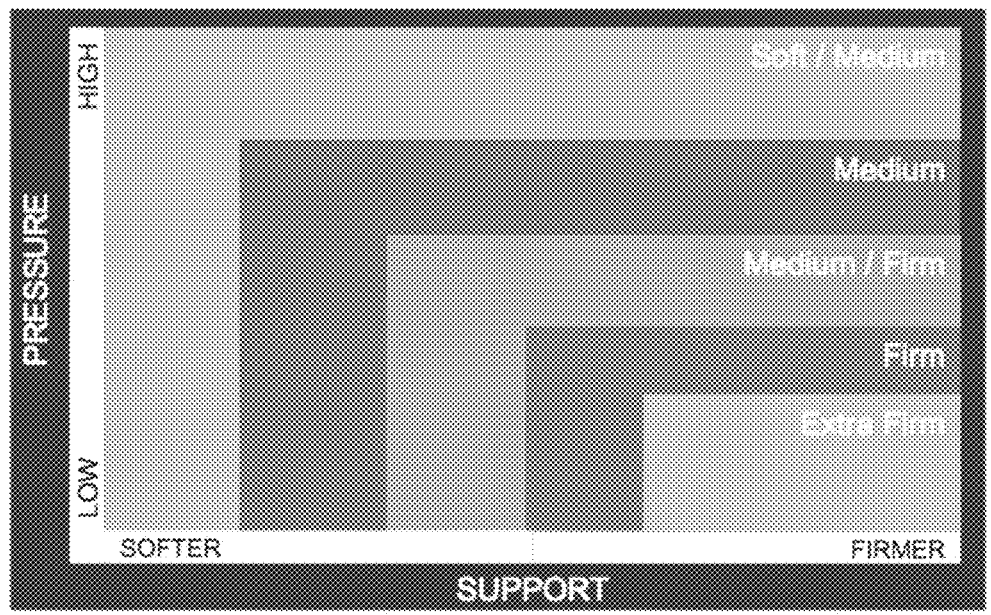
Figure 11b Five Mattress Categories and No Topper Categories

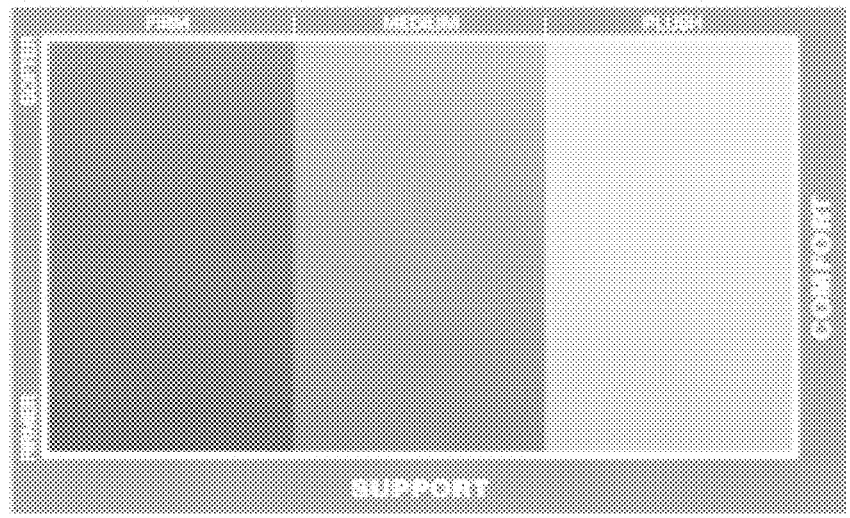
Figure 12a Mattress Support Category Grid
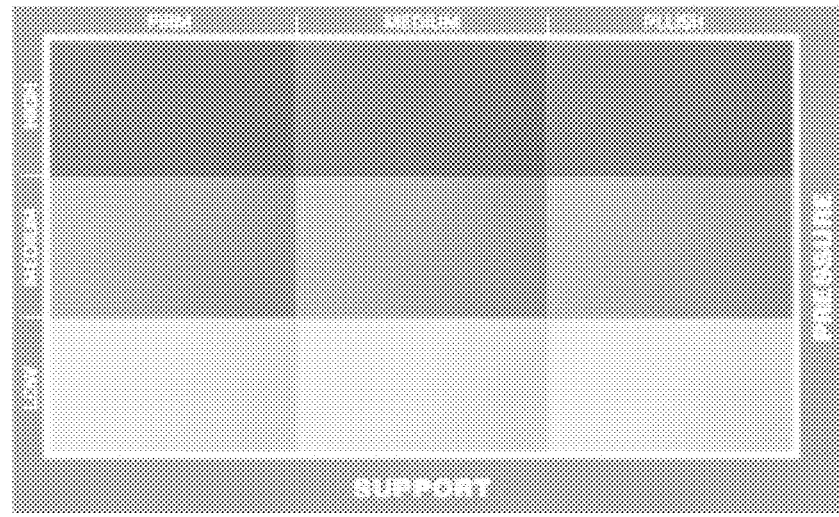
Figure 12b Nine Zone Category Grid

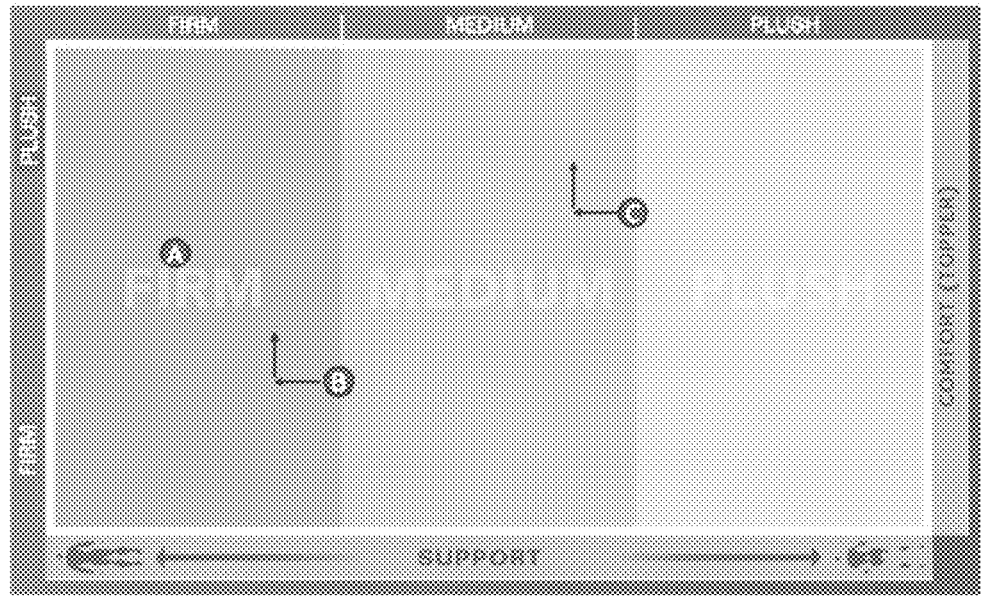
Figure 13a Category Adjustments Using Heuristic Rules
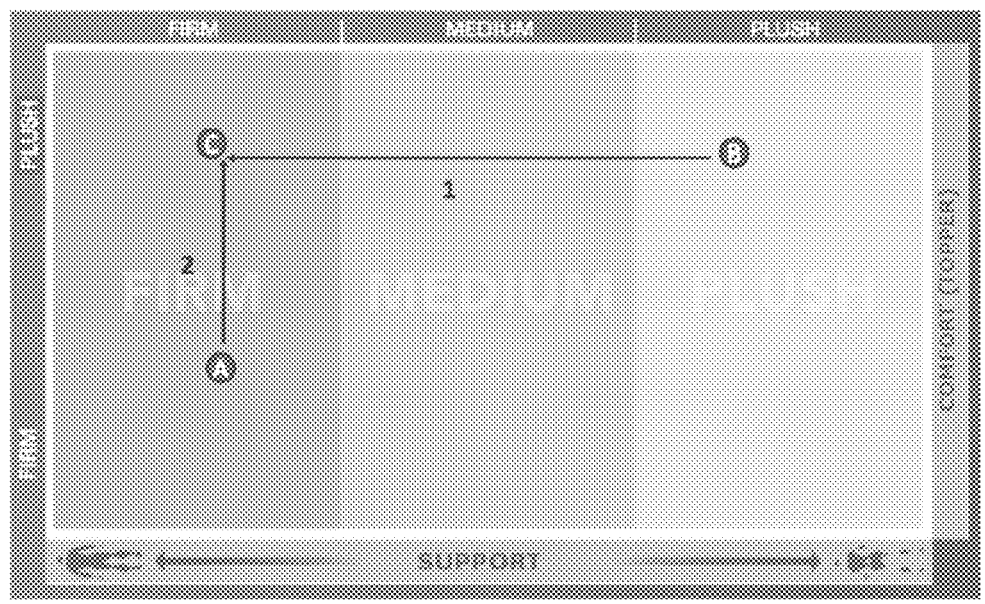
Figure 13b Category Adjustments For Two People

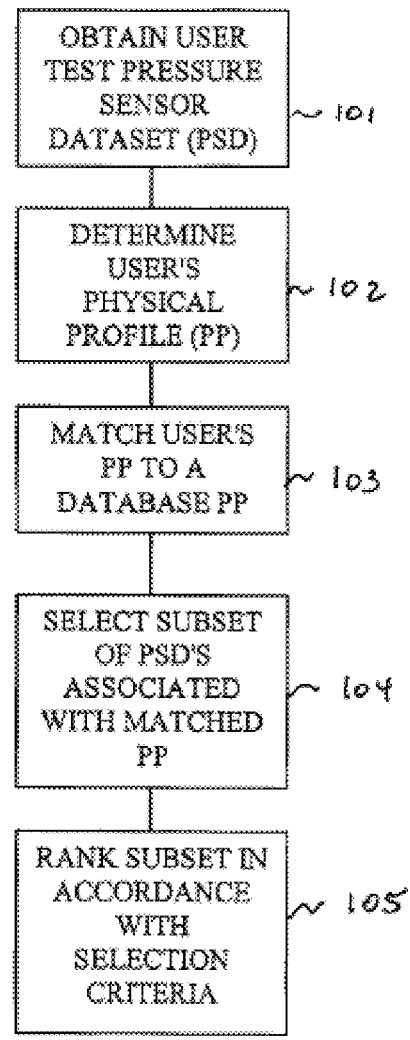
Figure 14 Mattress Recommendation and Ranking Process

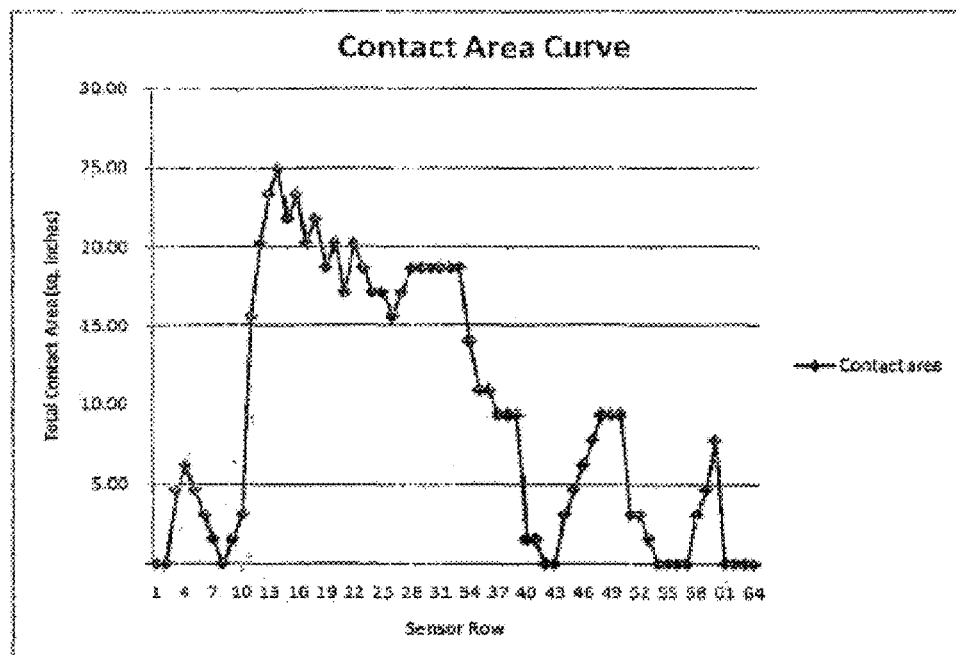
Figure 15 Contact Area Curve Derived from a Pressure Sensor Dataset
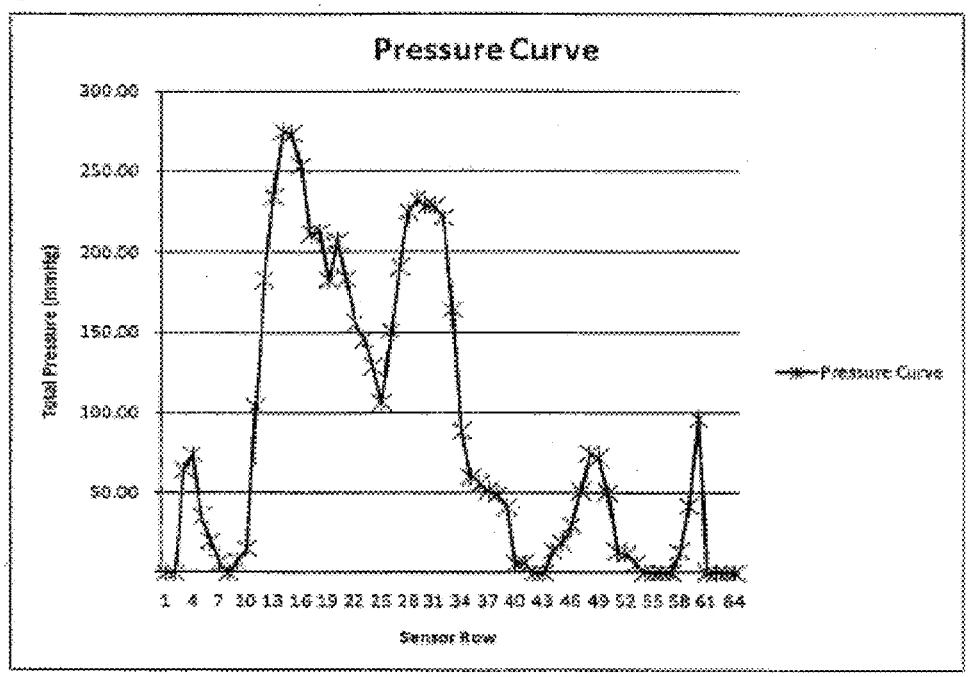
Figure 16 Pressure Curve Derived from a Pressure Sensor Dataset

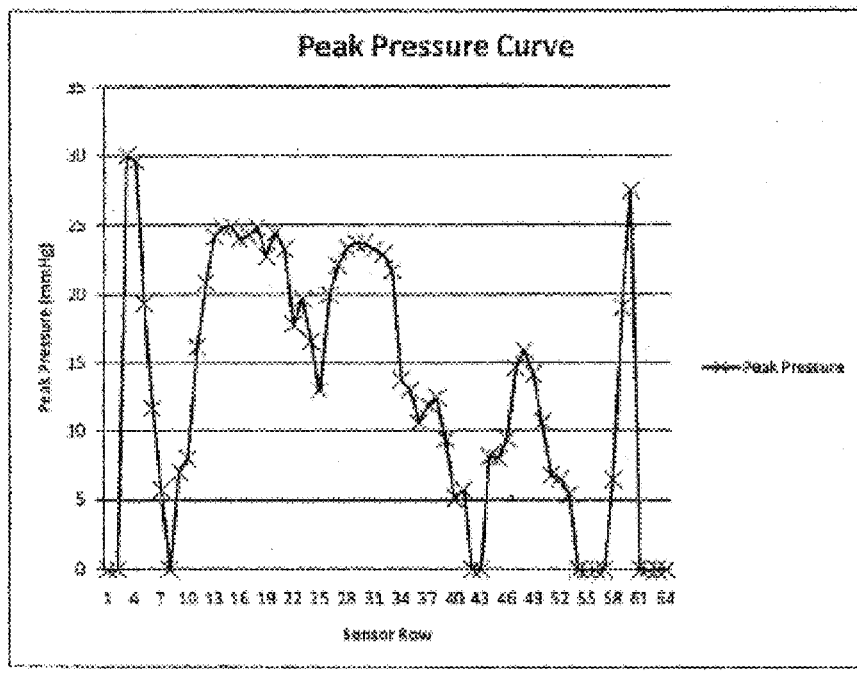
Figure 17 Peak Pressure Curve Derived from a Pressure Sensor Dataset
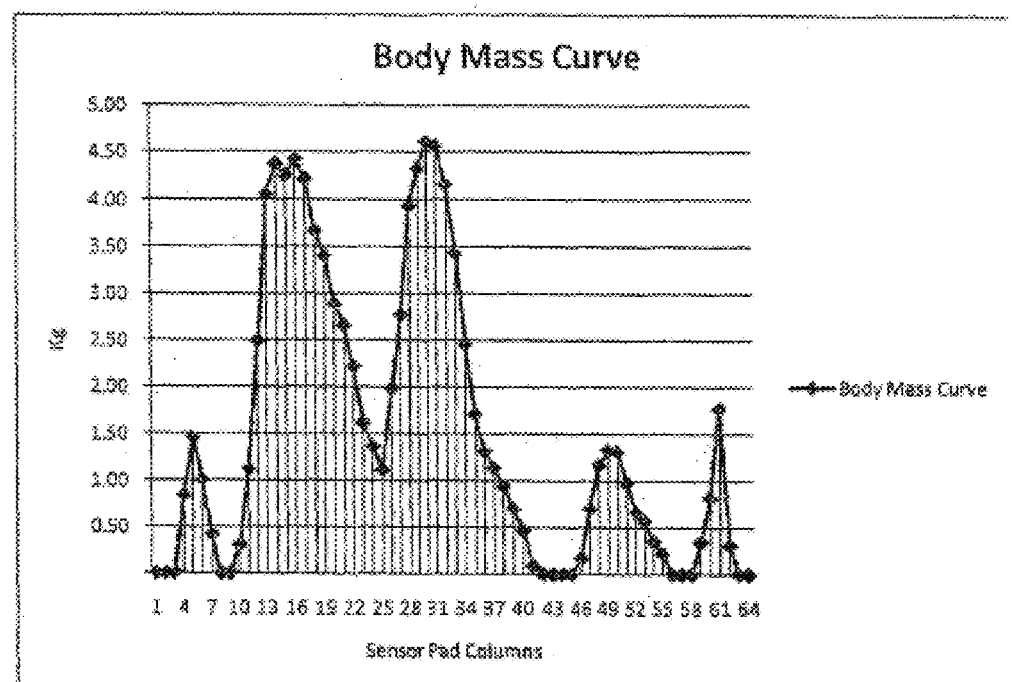
Total mass: 97.3 kg
Figure 18 Body Mass Curve Derived from a Pressure Sensor Dataset

GRAPHICAL DISPLAY FOR RECOMMENDING SLEEP COMFORT AND SUPPORT SYSTEMS

CROSS-REFERENCE TO RELATED APPLICATION(S)

This application is a continuation-in-part of International Application No. PCT/CA2011/000882, "Mattress Ranking and Selection," filed Jul. 29, 2011; which claims priority to U.S. Application No. 61/369,167, "Mattress Ranking and Selection," filed Jul. 30, 2010. This application also claims priority under 35 U.S.C. §119(e) to U.S. Application No. 61/739,617, "Recommending Sleep Comfort and Support Systems using Pressure Sensors," filed Dec. 19, 2012. The subject matter of all of the foregoing is incorporated herein by reference in their entirety.

BACKGROUND OF THE INVENTION

1. Field of the Invention

This invention relates generally to the analysis and presentation of pressure data for the recommendation of sleep systems including mattresses and other body support systems.

2. Description of the Related Art

The performance of mattress and other body support systems depends in part on the amount of pressure and the distribution of pressure experienced by different parts of the body. Pressure mapping systems have been used to assess support surfaces and compare performance differences for different body types. However, the process of pressure mapping various mattresses can be time consuming and may not result in the recommendation of the best possible mattress, for example if the best possible mattress was excluded from the mattresses tested.

Another problem with a simple pressure map of a mattress is that the sales staff can be inadequately trained to interpret the pressure map. In addition, skepticism by both the customer and sales associate can result if recommendations are inconsistent or unpredictable. This skepticism is increased when the sales associate cannot provide a clear explanation. Customer skepticism may further increase if the customer doesn't like the recommended mattress after trying it.

Consumers may become easily confused and overwhelmed by the large number of mattress choices available in the marketplace. Salespeople often use traditional feature-based selling techniques. However, consumers often do not understand how these features relate to comfort and quality of sleep and often have trouble relating these features to mattress comfort. Skepticism about the information being conveyed and/or lack of product knowledge by salespeople often results in the consumer walking out of the retail store to shop elsewhere. The mattress-buying process gets even more confusing because most manufacturers provide retailers with exclusive brand/model names, making it virtually impossible for consumers to direct comparison shop. This often creates a frustrating experience for consumers and may lead to mistrust and skepticism.

Therefore there is a need for a pressure mapping system that recommends mattresses, or categories of mattresses, in a manner that preferably is logical and easy for customers and sales associates to understand.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention has other advantages and features which will be more readily apparent from the following detailed description of the invention and the appended claims, when taken in conjunction with the accompanying drawings, in which:

FIG. 1 is a diagram of a pressure mapping system.

FIG. 2 is an exploded view of a capacitive pressure sensor.

FIG. 3 is a block diagram of a sensor electronics unit.

FIG. 4 is a flow diagram of an automatic analysis process.

FIG. 5 is an example of pressure maps of a back sleeper and a side sleeper.

FIG. 6 is an example of pressure map for different surface firmness.

FIG. 7 is a graph of customer reference data from a reference mattress.

FIG. 8 is an example of data samples framed with recommend categories.

FIG. 9 is an example of a customer located in a recommended category.

FIG. 10 is an example of a category recommend result.

FIGS. 11A-11B show two examples of different mattress and topper categories.

FIGS. 12A-12B show two examples of different category grids.

FIGS. 13A-13B show two examples of a category recommend process.

FIG. 14 is a flow diagram of an automatic analysis and ranking process.

FIG. 15 is an example of a contact area curve derived from a pressure sensor dataset.

FIG. 16 is an example of a pressure curve derived from a pressure sensor dataset.

FIG. 17 is an example of a peak pressure curve derived from a pressure sensor dataset.

FIG. 18 is an example of a body mass curve derived from a pressure sensor dataset.

DETAILED DESCRIPTION OF THE PREFERRED EMBODIMENTS

A pressure sensor measures the surface pressure distribution of a body supported by a surface, for example a person lying on a mattress. In one approach, a pressure mapping system is placed on a standardized reference mattress and a customer shopping for a mattress lies on the mattress to be analyzed by the system. The pressure mapping system presents this pressure data in the form of a two dimensional pressure map. The pressure map can be used by sales associates to determine the support and comfort requirements for the customer's body type.

In one implementation, the pressure mapping system analyses pressure and contact area data in both back and side sleeping positions and places the customer in a category based on historical data acquired by pressure mapping a large sample of customers. The category corresponds to mattress features commonly recommended to people with that body type. For example, a large male with a mesomorph body type generally requires a mattress system with firm support.

In another aspect, when a couple are looking for a mattress, the pressure mapping system analyses pressure and contact area data in both back and side sleeping positions for two people. The pressure data and contact area data is analyzed for each person and they are individually categorized based on historical data acquired by pressure mapping a large sample of customers. The application software then implements a set of heuristic rules to recommend a mattress that is most suitable for both body types.

In another aspect, mattresses are ranked for individual users. For example, the user's pressure sensor dataset may be compared to a database of pressure sensor datasets for different mattresses to determine suitability of and/or preference for certain mattresses or categories of mattresses.

The ability to quickly perform pressure measurements and categorize or rank the analyzed data based on historical data, facilitates rapid and more consistent recommendations of mattress categories or specific mattresses for customers wanting to purchase a mattress. By using a standardized reference mattress, the category or specific mattress recommendations are consistent from store to store and people with similar body types will be given consistent recommendations.

The system shown in FIG. 1 includes three major components, the mattress sensor (10), the sensor electronics unit (11), and the computer (15), including display. The computer includes software subcomponents including the operating system (14), the application software (13), and the pressure analysis routines (12). The mattress sensor is placed on a reference mattress (16) in a mattress retail environment for the purpose of pressure mapping customers.

MATTRESS SENSOR. A mattress pressure sensor (10) can come in various sizes to suit a wide range of standardized mattress sizes. Typically, there is a pressure sensor mounted permanently on a reference mattress large enough for one person. However, the system could also support the simultaneous analysis of two people by mounting two pressure sensors on a larger reference mattress. For example, mattress or bed sensors typically have sensing areas ranging from 30"×74" to 54"×84", or preferably 32.5"×80". Other sensing areas are possible to accommodate a wide variety of reference mattress sizes. Larger reference mattresses suitable for pressure mapping two people simultaneously can be fitted with two sensors each having an equivalent sensing area designed to pressure map one person only. Alternatively, the sensor can also be made larger to accommodate the area of the larger reference mattress and to simultaneously map two people.

Each pressure sensor (10) contains an array of individual pressure sensing elements. Mattress sensor resolution is typically 0.5" to 2" pitch, or preferably 1.25" pitch. A sensel is an individual sensor within a sensor array. Bed sensor arrays are typically 16 sensels×40 sensels to 64 sensels×160 sensels, or preferably 26 sensels×64 sensels. The number of sensels required is dependent on the sensing area and the resolution of the sensor.

Mattress pressure sensors preferably are thin and flexible sensors that are designed to conform to the shape of the body of the person lying on the reference mattress. They are typically covered with a light fabric, for example nylon taffeta, and may incorporate buckles, straps, or other methods of attaching the sensor to the reference mattress. The sensor cover material may be printed on one side with a grid representing the location of the individual sensels within the sensor array. This helps the sales associate align the customer within the sensing area and thereby improves the accuracy of the measurement.

The mattress pressure sensor may be placed on top of the mattress and held in position using a sensor carrier that straps, bounds or holds the sensor in place when a customer is lying on the reference bed. A custom fitted sheet may also be used to cover the sensor and prevent it from moving out of position when a customer is lying on the reference bed.

Examples of mattress pressure sensors include resistive pressure sensors, fibre-optic pressure sensors, or preferably capacitive pressure sensors. FIG. 2 illustrates the construction of an example capacitive pressure sensor. The sensor includes column electrodes (23) onto which a sinusoidal electrical signal is injected and row electrodes (22) where an attenuated sinusoidal signal is detected. The row and column electrodes are constructed of strips of electrically conductive material such as copper strips, aluminum strips, tin strips, or preferably conductive fabric or flexible circuit. The row and column electrodes are separated by a compressible dielectric material (21) such that the dielectric compresses according to the pressure applied to the surface of the sensor. An electrical signal is injected on a column electrode and is then attenuated as it passes through the dielectric material to the row electrode where the attenuated signal may be detected. The attenuation of the signal depends on the amount of mechanical dielectric compression resulting from the applied pressure. The detected signal can be measured by the sensor electronics and converted to a pressure value using a calibration process. The row and column electrodes are connected to the sensor electronics using a ribbon cable (24) or other electrically conductive wiring harness, for example, discrete wires, conductive fabric, printed circuit board, or preferably, a flexible circuit.

SENSOR ELECTRONICS UNIT. An example sensor electronics unit shown in FIG. 3 includes a digital signal processor (DSP) (30), injection signal generation and control (32), (37), (35), signal detection and control (36), (37), (38), (34), a digital logic device (33), and a data communications interface (31).

The DSP (30) executes firmware that is designed to receive control messages from application software running on a PC via the data communications interface (31). The control messages include measurement requests that contain coordinates for an individual sensing element (sensel) within the pressure sensor array. The DSP (30) selects a column for the injection signal and a row for signal detection. The detected signal is then converted from analog to digital (34) for measurement processing by the DSP (30). The measurement is then passed back to the application software via the data communications interface (31).

The DSP (30) may be a standalone device or include external memory such as Random Access Memory (RAM), Read Only Memory (ROM), or any other commonly used memory device. Memory devices can be accessed either serially or via parallel data bus.

The sensor injection signal generation block (32) is an electronic device or circuit used to create a sinusoidal injection signal at a selectable frequency. The injection signal can be in the range of 50 kHz to 5 MHz, or preferably 250 kHz or 100 kHz.

The gain control block (37) is an electronic device or circuit used to adjust the amplitude of the injection signal. The gain setting is controlled by the DSP (30) via the digital logic device (33). The amplified injection signal is connected to the transmit switch matrix (35). The DSP (30) configures the digital logic device (33) to enable the appropriate switch in the switch matrix in order to select a sensor column for transmitting the injection signal.

The injection signal passes through the pressure sensor and is detected on a row selected using the receive switch matrix (36). The sensor row is selected by the DSP (30) via the digital logic device (33) and the selected signal is connected to the gain control block (37) for amplification.

An analog filter (38) removes signal noise before the analog to digital converter (ADC) (34). The analog filter is an electronic device or circuit that acts as a band pass or low pass filter and only passes frequencies near the injection signal frequency. For example, if the injection signal has a frequency of 250 kHz the filter only passes frequencies in the range of 200 kHz to 350 kHz and thereby rejects other interfering signals that are not within the pass band. The analog filter can be designed to accommodate pass bands of variable frequency spreads where tighter frequency spreads more effectively filter interfering signals.

The ADC (34) is periodically sampled by the DSP (30) in order to acquire sufficient samples for performing a measurement calculation. For example, 12, 24, 48, 96, or 192 samples can be acquired before performing a measurement calculation on the samples. The DSP (30) can also execute firmware to perform additional digital filtering in order to further reduce the frequency spread of the pass band and more effectively filter interfering signals. Digital filtering requires more samples from the ADC (34), for example in the range of 50 to 2500 samples, or preferably 512 samples.

The data communications interface (31) passes data between the DSP (30) and the application software running on a PC. The interface includes electronic devices or circuitry to perform wired or wireless communication. Examples of wired communication include RS232 serial, Universal Serial Bus (USB), Ethernet, fibre-optic, or any other serial or parallel data communication technology. Examples of wireless communication include, Zigbee, Bluetooth, WiFi, Wireless USB, or any other wireless data communication technology.

The digital logic device (33) includes electronic devices or circuitry, for example complex programmable logic devices (CPLD), field programmable gate arrays (FPGA), application specific integrated circuits (ASIC), or discrete logic devices.

APPLICATION SOFTWARE. In this example, the pressure mapping application software (13) runs on a standard computer device, for example, a desktop computer, laptop, pad computer, tablet, touchscreen computer, personal data assistant, smart phone, handheld computer, server, or mainframe computer.

The application software (13) runs with a standard computer or embedded operating system (OS) (14) such as Linux, embedded Linux, NetBSD, WindowsCE, Windows 7 or 8 embedded, Mac OS, iOS, Android, QNX, Blackberry OS, or preferably, Windows8, Windows7 or WindowsXP.

The application software performs basic functionality such as data messaging with the sensor electronics (11), conversion of measurements from the sensor electronics (11) to calibrated pressure values, display processing and control for the pressure map and user interface, calibration management and control, and numerous user-initiated advanced measurement processing and image processing techniques.

The application software performs a number of automated measurements that are derived from the pressure data. For example, contact area can be calculated for the entire pressure map. Contact area is based on the number of sensels with measured pressure above a minimum threshold. In another example, average peak pressure can be calculated over the entire pressure map. In another example, a load calculation can be automatically performed using the pressure data and the contact area. In another example, pressure data can be used to approximate shear forces.

MATTRESS CATEGORY RECOMMENDATION PROCESS. FIG. 4 illustrates one approach used to arrive at a recommended mattress category based on measurements acquired from a pressure mapping system.

PRESSURE MAPPING. The first step is to have the customer lie on the reference mattress for pressure mapping. A pressure sensor dataset is acquired from the sensor and may be displayed to the customer in the form of a two dimensional pressure map that is colour coded such that higher pressures are displayed in increasingly intense colours. For example, as pressure increases, the colour on the pressure map changes from blue to yellow to orange to red. Other colour or grey scales may be implemented to convey increases in pressure. The pressure map allows the sales associate to discuss features of the pressure map related to comfort. For example, high pressure areas are displayed in yellow or red on the pressure map.

In one approach a customer lies on a reference mattress equipped with a pressure sensor and the customer is pressure mapped on their back, on their side, or both on their back and on their side. In FIG. 5, an example of pressure map images are shown for a customer lying on his back (38) and lying on his side (39). These images are acquired using a pressure mapping system. The pressure map may be captured as a single frame, multiple frames, or frames recorded continuously over a period of time and averaged.

In the pressure mapping step, the sales associate can review the pressure map with the customer and discuss map characteristics that are pertinent to the selection of a mattress. For example, low contact area or high pressure peaks can be pointed out as problems to be resolved by the selection of an appropriate mattress. For example, FIG. 6 illustrates a person mapped on surfaces with 3 levels of firmness. The first image (44) has very little contact in the lower back region. This surface is probably too firm. The second image (45) has improved contact area in the lower back region but the third image (46) has the best contact area of the three surfaces tested. If a customer lies on the reference mattress and has a pressure image similar to the first image (44) then the sales associate may state that the pressure map is indicating that the customer might prefer a more plush mattress. This can be confirmed in the recommendation step.

PRESSURE SENSOR DATA ANALYSIS. In the next step of the process, the system analyzes the pressure data measured by the pressure mapping system. In the analysis, average peak pressure can be calculated. In one approach, average peak pressure is calculated by isolating a group of sensels with the highest measured pressures (the peak pressures), then averaging those pressure values to obtain the result. A sensel is an individual sensing element within the sensor array. For example, using a bed sensor with 1664 sensels in the sensor area, the 16 sensels with the highest pressure measurements could be averaged to determine the average peak pressure. The number of sensels averaged could be 25% to 0.5%, or preferably 1%, of the total number of sensels in the array. The number of sensels averaged could also be 25% to 0.5%, or preferably 1%, of the total number of sensels in the array that are above a pressure threshold, for example, 10 mmHg. The average peak pressure algorithm may also reject peak pressures to reduce the impact of creases in the sensor, objects in the customer's pockets, or hard edges in the customer's clothing. For example, the one to ten, or preferably three, highest pressure measurements can be excluded from the average peak pressure calculation.

In the pressure sensor data analysis, contact area can also be calculated. Contact area is calculated by summing the area of the number of sensels above a minimum pressure threshold. For example, the minimum pressure threshold is typically between 1 mmHg and 20 mmHg, or preferable 5 mmHg.

Other pressure related parameters can also be calculated from the sensor data. For example, a load calculation could be used to estimate the person's weight. The person's height can be estimated by adding the number of sensels above a minimum pressure from the person's head to their toes, when they are lying on their back. Shear force can also be estimated based on the pressure gradient between sensels. Height, weight, and shear information can be used to further identify the characteristics of the person's body. Peak pressure or average pressure can be used instead of average peak pressure to characterize a body type. Body measurement ratios may also be used to characterize a body type. For example, the same process used to calculate a customer's height could be applied to calculate shoulder width, hip width and waist width. Ratios between the shoulder, hip, and waist widths can be used to characterize a body type.

Pressure measurements can also be subdivided into body zones or body areas to refine the characterization of a person's body. For example, contact area could be calculated specifically in the lower back zone of a person's body, or peak pressures could be isolated to the shoulder and buttocks.

The analyzed pressure data is then correlated to actual pressure mapping data acquired from a large sample of customer measurements acquired on a reference mattress in a retail environment. The number of reference data samples may be from 50 to 5000, or preferably 100 to 500 samples. A greater number of samples provides a more accurate picture of the pressure mapping characteristics of the general population on a reference mattress. FIG. 7 illustrates a distribution of reference data samples with contact area and average peak pressure being the measurements used to characterize body types. The distribution illustrates the relationship between average peak pressure and contact area over a broad range of body types. The inner two circles shown on the graph represent the most common body types and how they are clustered within a range of pressures and areas. The outer circle captures 99% of the customers that were mapped. It can be seen in FIG. 7, that a customer being pressure mapped on a reference mattress will have contact areas between 300 and 800 square inches and will have average peak pressures between 25 and 50 mmHg. The range of measurement values is dependent on the physical properties of the reference mattress. In one approach, if a customer's average peak pressure or contact area measure falls outside the range of measurement values then the uppermost or lowermost value of the measurement range will be used.

The reference mattress typically includes a base layer and a topper layer. The reference mattress base layer can be constructed of standard mattress materials such as hair, straw, cotton, a framework of metal or plastic springs, air bladders, or preferably latex foam. The reference mattress cover, or topper, layer can be constructed of heavy cloth, quilted or non-quilted, down or synthetic fibre, air bladders, elastomeric gel or preferably viscoelastic foam. For example, a reference mattress consists of two layers of foam that are 2" to 6" thick or preferably 3" thick. The base layer foam may have different thickness than the topper layer foam. The base layer foam may also have a different hardness than the topper layer foam. For example, the base layer may have an Impression, Load, Deflection (ILD) rating of 31 to 65 or preferably 36 while the topper layer has an ILD rating of 10 to 30 or preferably 28. A foam with a higher ILD rating is more firm.

The reference mattress is sized to fit a single person or to fit two people at the same time. For example, the reference mattress can be between 30"×74" and 76" and 84", or preferably 32"×80" for a single mattress and 76"×80" for a two person mattress. Two people can be pressure mapped consecutively on a single mattress or simultaneously on a two person mattress.

The reference mattress typically is supported by a frame that provides a wood, metal, foam or box spring base. The sides of the frame may provide a protective box around the reference mattress or the frame may only be deep enough to prevent the reference mattress from slipping off the frame. In the example of a protective frame, the sides of the frame are padded to enhance comfort when the customer is entering and exiting the reference mattress. The protective frame can also be constructed of a soft material such as foam to eliminate the need for additional padding.

Any mattress or material can be used as the reference mattress but the reference mattress should be chosen such that there is little variation in its performance properties over time, with repeated use, or from sample measurement to sample measurement. The mattress or material chosen should also be repeatable such that multiple reference mattresses in various locations will have identical performance properties within acceptable tolerances. For example, the same person mapped on two different reference mattresses preferably have average peak pressure or contact area measurements that are within +/−15% or better. The reference mattress used in retail locations should have equivalent performance characteristics to the reference mattress used to acquire the pressure and contact area data distribution. For example, if the same person is mapped on two different reference mattresses, the measurement variation preferably should not exceed +/−25% or less, or more preferably should not exceed +/−10%.

The data samples acquired using the reference mattress are mapped onto a grid of mattress categories. For example, FIG. 8 shows the data samples mapped onto a three by three grid of mattress categories. The horizontal axis has mattress base categories of "Firm", "Medium" and "Plush" while the vertical axis has mattress topper categories of "Firm Top", "Plush Top", and "Pillow Top". When a new customer is pressure mapped on the reference mattress their contact area and average peak pressure measurements are located within the recommendation categories. For example, in FIG. 9 customer "A" has a contact area of 600 square inches and an average peak pressure of 37 mmHg. These coordinates clearly place the customer in the "Firm" mattress base category and the "Plush Top" Topper category.

PRESENTATION OF RESULTS. In the final step of the category recommendation process, the results of the data analysis are presented in such a way that the customer and sales associate understand what type of mattress is being recommended. For example, the results screen displays a graph with mattress support on one axis, and topper comfort on another axis, as shown in FIG. 9. It can quickly be seen that customer A is being recommended a firm mattress with a plush topper. The sales associate may then use this information to take the customer to a variety of beds with the recommended characteristics and allow the customer to try them out. Other types of results displays can also be used, for example the graph shown in FIG. 9 may be printed out for the customer or sales associate.

The results data is also presented in such a way that the data analysis behind the mattress recommendation can easily be explained by the sales associate. For example, the SUPPORT axis of the results graph is also labeled with a contact area range as shown in FIG. 9. It becomes clear that a person with greater contact area on the reference mattress will require a firmer mattress that provides more support. In another example, the topper plushness axis is also labeled with a range of peak pressures as shown in FIG. 9. It becomes clear that person that has higher peak pressures will require a more plush topper to distribute and reduce these peak pressures.

The category recommendation process uses guidelines to relate pressure sensor data to the features of common mattress categories. The best mattress recommendation will be based on a combination of mattress firmness and topper plushness. For example, larger body types have higher contact areas as well as higher average peak pressure when pressure mapped on the reference mattress. A large body type usually requires more support from the mattress base. Therefore, a firmer mattress recommendation is preferred. In another example, a mesomorphic large body has a higher average peak pressure than an endomorphic body type of similar size and contact area. A firmer mattress topper recommendation is preferred for the endomorphic body type because they do not have high peak pressures to be relieved by a more plush mattress topper. In another example, smaller body types typically can use a softer mattress with a firmer topper for proper support. However, a small ectomorphic body type may have bony prominences that require additional plushness in the topper to relieve peak pressures.

CUSTOMIZATION OF RESULTS PRESENTATION. The category recommendation results can be presented in a number of different formats that correlate a retailer's, or mattress manufacturer's, suite of mattress categories to the distribution of reference mattress pressure measurements made on a large sample of people. For example, the X/Y-axis of the results graph can be mattress firmness/topper plushness respectively. Conversely, the X/Y axis of the results graph can be topper plushness/mattress firmness respectively. Other descriptions may be used to describe the mattress components on the X/Y axis or various graphical representations may be used to convey the information. For example, as shown in FIG. 10, the results screen provides a SUPPORT axis and a COMFORT axis as well as a clearly identified grid to highlight the three available topper categories.

An Icon or symbol is used to locate a customer's pressure map measurements within the category recommendation results. For example, in FIG. 10 customer "Elizabeth" is identified with a bed icon that is labeled with her name. Any number of icons or other representations may be used to display a customer's category recommend results.

The average peak pressure scale or contact area scale can be implemented in ascending or descending order. The upper and lower limits of the average peak pressure scales may also be adjusted to suit the characteristics of the reference mattress or to adjust the alignment of reference data points to mattress categories. For example, the SUPPORT axis shown in FIG. 10 could have the PLUSH mattress category on the left and the FIRM category on the right. This would simply require inverting the contact area scale on the support axis such that higher contact areas are on the right.

The results presentation can be adjusted to match a mattress retailer's or manufacturer's range of mattress categories. The number of categories on each axis may also be selected based on the number of mattress categories available from the retailer or mattress manufacturer. For example, FIG. 11 shows an example of two different results screens. In FIG. 11A, the retailer has only two types of mattresses (plush or firm) but has a selection of four different topper firmnesses. In FIG. 11B, the retailer has no topper options but has five different mattress categories.

The results presentation can be adjusted to highlight specific mattress categories using a grid background color, shading, or outline. For example, in FIG. 10 the three mattress topper categories are highlighted by distinct backgrounds. Other possible variations are shown in FIG. 12. FIG. 12A illustrates a category grid that highlights the three mattress categories. FIG. 12B illustrates a category grid that highlights all nine possible combinations of mattress categories.

The results may also be presented with no clear grid demarcations. A color gradient may be used in the background to indicate a progression from firm to plush or a solid background may be used with the axis labeled from firm to plush. This simplified results presentation allows the sales associate the freedom to make personal category adjustments based on their own knowledge and experience.

The customization of the results presentation is performed using an administration panel or a customization file that can be created and modified by sales associates or administrators of the category recommendation system.

HEURISTIC RULES. In order to make a category recommendation when a person's average peak pressures and contact area measurements place them directly on the dividing line between categories, some additional heuristic rules may be applied to make an unambiguous recommendation. These heuristic rules are applied automatically by the software or the adjustment to the recommendation can be performed by the sales associate. The heuristic rules are also applied to recommend a category that is a compromise for two people wishing to share the same mattress. For example, when pressure mapping to recommend a mattress for two people, the application software can describe these heuristic rules in the form of notes to the sales associate or the software can show an extra marker on the results screen which represents the category recommendation adjusted to best suit both individuals.

If a compromise must be made, it is usually better to recommend a more firm mattress for a person as opposed to recommending a less firm mattress. A mattress that is too firm can be mitigated to some extent by using a plush topper, for example, a firm mattress with a 'pillow top'. FIG. 13A illustrates how customer B and customer C are recommended the firmer mattress and more plush topper when they are mapped onto a dividing line between categories. FIG. 13B illustrates how a couple (customer A and customer B) are recommended a firm mattress with a plush topper. In this case, a firmer mattress is selected based on customer A's requirements but an extra plush topper is selected for customer B to mitigate the extra mattress firmness and ensure that the mattress will be comfortable for customer B as well. The resulting category recommendation is shown as "C" on the figure.

Other more complex heuristic rules may be applied to improve recommendations. For example, side sleepers may be recommended a less firm mattress than back sleepers. Adjustments to the recommendation may also be made based on customer preference or cultural preferences. For example, populations within certain countries are known to favor very firm mattresses and, as a result, the system settings may be adjusted to recommend more firm mattresses in retail locations for these countries.

Mattress Recommendation and Ranking Process

FIG. 14 illustrates one approach used to provide a ranked recommendation of mattresses based on measurements acquired from a pressure mapping system.

PRESSURE MAPPING. The first step is to have the customer lie on the reference mattress for pressure mapping.

A pressure sensor dataset is acquired from the sensor and may be displayed to the customer in the form of a two dimensional pressure map that is colour coded such that higher pressures are displayed in increasingly intense colours.

The pressure sensor dataset may be converted into other forms of data which would vary from user to user, according to the user's physical characteristics. In one example, a contact area curve as shown in FIG. 15 may be derived by summing contact area along each row in the pressure sensor dataset. In another example, a pressure curve may be derived by summing total pressure along each row, as shown in FIG. 16. In yet another example, a peak pressure curve as shown in FIG. 17 may be derived by selecting the highest pressures recorded in each row. These secondary representations of the pressure sensor dataset, or "physical profile" data, may be used to match the customer's physical profile to a database of physical profiles.

PHYSICAL PROFILE. A "physical profile" is at least one physical attribute of individuals which can be derived from the pressure sensor dataset acquired from a reference mattress. The physical profile may include attributes such as measurements of certain body features, for example, shoulder-width, hip-width or waist-width; or ratios of these measurements, for example, shoulder to hip ratio, shoulder to waist ratio, or waist to hip ratio; sleep position, for example, back, side, or front; body type, for example endomorph, ectomorph, endomorph; or preferably Body Mass Index (BMI). Other physical attributes may include variations of BMI or body shape measurements, ratios, or positions.

A body mass index is a measure of a person's weight relative to height. Body mass index (BMI) is defined as the individual's body weight divided by the square of his or her height. The medically accepted formula produces a unit of measure of $kg/m^2$. BMIs are conventionally grouped into four categories (BMI I-IV), however, BMI categorization different from medically accepted standards may be implemented. For example, more categories may be used, or modified height/weight ratios may be used to arrive at a modified BMI.

The customer's "physical profile" is compared to a database of "physical profiles" to obtain a profile match. For example, the number of different physical profiles obtained from the combination of 4 BMI categories, 3 body shape categories, and 3 sleep position categories would be 36. The customer's "physical profile" is compared to 36 database profiles and a best match is selected.

The physical profile database is created by pressure mapping a large number of people with various body types on a reference mattress as well as a selection of mattresses. The reference mattress pressure map is processed to fit the pressure sensor dataset to specific physical profile categories. Using the previous example, the test subjects are classified into 4 BMI categories, 3 body shape categories, and 3 sleep position categories. Dataset signatures are then created for each category by placing boundaries on the physical profile measurements obtained from the pressure sensor dataset.

Each physical profile category is assigned a recommended selection of mattresses. The assignment and ranking of mattresses is performed using metrics obtained from the pressure sensor. For example, each test subject is pressure mapped on all the mattresses available in a retail store or all the mattresses produced by a particular mattress manufacturer. The selection criteria described in the category recommend process can be applied to rank the suitability of each mattress for each test subject. For example, average peak pressure and contact area can be used to rank mattresses for each test subject. The mattress that provides the lowest average peak pressure and greatest contact area is given the best ranking Expert opinion and customer feedback can also be used to adjust and finalize the mattress ranking process.

In another example, each test subject is tested on the reference mattress and the category recommend process is applied to recommend a base and topper firmness. Expert opinion is then used to rank the three most suitable mattresses from all the available mattress choices. In yet another example, customer feedback is used to identify the customer's with greatest satisfaction with their mattress purchase. This satisfaction rating is used to correlate their physical profile to the mattress or mattress category purchased by the customer. In this manner the physical profile database is continuously updated to adjust mattress rankings based on customer feedback.

The physical profile database may be developed by the use of human volunteers having known or measurable physical profiles, or with human-shaped dummies that approximate the physical profiles chosen for categorization. The database may be developed with computer simulations or extrapolations of known pressure sensor datasets. Preferably, the database is developed using data acquired from datasets acquired from customers who are pressure mapped in store locations using the pressure mapping system. The larger the database, the greater the accuracy of the mattress recommendation. The number of test subjects, the number of physical profile categories, and the number of mattresses available will determine the size of the database.

The database matching algorithm may use any number of different approaches to match the pressure sensor dataset acquired for a customer to a stored physical profile. In one embodiment, the system may calculate a body mass index for the user by determining or approximating the user's weight and height. The user's height may be estimated by determining the head and feet positions on the pressure sensor dataset. The user's weight may be estimated by summing the total pressure sensed and calculating the total contact area. Sleep position may be determined by matching pressure patterns which are unique to the various sleep positions which may be encountered. Body shape may be determined by determining contact area and contact outline, such as by examining a contact area curve and pressure curve over the length of the pressure sensor dataset.

The database may include a ranking of one to ten mattresses, or preferably three mattresses, for each of the physical profile categories captured in the database. For example, if the database is created using 4 BMI categories then 3 mattresses are ranked for each category. A maximum of 12 different mattresses will be available for recommendation with each customer receiving a ranked recommendation of three mattresses.

MATTRESS SELECTION AND RANKING CRITERIA. Mattresses are ranked using at least one selection criterion, or preferably a combination of different selection criteria. A selection criterion represents a parameter which could affect comfort and sleep quality. The selected mattresses may therefore be ranked in accordance with one or more of these criteria. If criteria are combined, then they may be weighted equally, or unequally to emphasize certain criteria over others. For example, the selection criteria may comprise one or more of the following:

(a) total contact area;
(b) peak pressure areas or peak pressure points;
(c) pressure distribution;

(d) mass distribution;
(f) pressure zones; or
(g) pressure gradients or shear.

Total contact area is calculated by summing the area of the number of sensels above a minimum pressure threshold. For example, the minimum pressure threshold is typically between 1 mmHg and 20 mmHg, or preferably 10 mmHg. Contact area may also be subdivided into sensor rows or columns in order to match contact area to body features. For example, when examining sensor rows along the length of a person lying on their back, contact area peaks will occur around the shoulders and hips. An exemplary head-to-toe contact area curve is shown in FIG. 15, where sensor row 1 is at the head, and sensor row 64 is at the foot. The information included in the contact area curve is used to filter and rank the available mattresses. For example, mattresses can be excluded from the ranked list of recommended mattresses if they do not exceed a minimum threshold for contact area in the lower back region. Contact area can also be used to rank mattresses, for example, higher contact area in the lower back region is given a higher ranking Similarly, peak pressure areas are used to filter and rank the available mattresses. For example, a maximum peak pressure threshold can be used to exclude mattresses from the ranked list of recommended mattresses. In another example, a peak pressure curve is created along the length of a person lying on their back or side, as shown in FIG. 17, and different peak pressure thresholds are used for the shoulders and hips. Peak pressures above the thresholds set for these regions result in the mattress being excluded from the list of recommended mattresses. Peak pressures can also be used to rank mattresses, for example, lower average peak pressures is given a higher ranking.

Pressure distribution refers to the amount of pressure measured within a given area. For example, threshold pressure values may be used to determine a broad pressure distribution that compares the percentage of contact area that exceeds a high pressure threshold and the percentage of contact area that is below a low pressure threshold. The sensing area can also be divided into body zones, for example, head, shoulders, lower back, hips, legs and feet. Pressure distributions can be calculated for each body zone. Pressure distributions between body zones can also be compared. Pressure distribution information is used to determine which mattresses will be excluded from the list of recommended mattresses. Pressure distribution can also be used to rank mattresses, for example, lower variation in pressure distribution between body zones is given a higher ranking Mass distribution requires calculation of a mass based on applied pressure over a given unit area. For example, a mass can be calculated for each individual sensel in the sensing array by multiplying the measured pressure by the area of the sensel. Mass can also be calculated for larger areas by averaging pressure measurements over a group of sensels, for example 2×2 or 4×4 sensels. A body mass curve can be created along the length of the body as shown in FIG. 18. A mass threshold can then be used to determine which mattresses will be excluded from the list of recommended mattresses. Mass distribution can also be used to rank a mattress, for example, a smoother body mass distribution (lower variation between mass peaks and average mass) is given a higher ranking.

Pressure gradients are indicative of the presence or absence of shear. Undesirable shear occurs when friction holds skin in place but gravity pulls axial skeleton down—results in stretching of perforating arterioles and compromise or perfusion of dermal layers. A large pressure differential between adjacent sensors is indicative of the potential for shear. The pressure sensor measurements can be analyzed to quantify average shear, peak shear, or number of sensel locations that exceed a predetermined shear threshold value. Shear threshold values can be used to determine which mattresses will be excluded from a list of recommended mattresses. Shear can also be used to rank a mattress, for example, a lower average shear value is given a higher ranking Application of the selection criteria will result in a selection and ranking of mattresses for each physical profile category based on measurements obtained from test subjects for each physical profile category. For example, if the selection criteria comprises contact area, where maximization of contact area is considered favourable, then for each physical profile category a subset of all available mattresses will be selected and ranked based on contact area. Test subjects within each physical profile category will have different results with respect to the selection criteria. Therefore, mattresses rankings will be assigned based on the most common mattress rankings for each test subject within a physical profile category.

SELECTION FILTERS. A customer is pressure mapped on a reference mattress and then matched to a physical profile category within a mattress recommendation database. The matched physical profile is used to recommend and rank mattresses based on the ranking and selection criteria. Additional selection filters may also be used to narrow the chosen subset of mattresses. For example, the number of recommended mattresses may be reduced based on customer preferences around one or more of the following criteria:

Firmness of the mattress;
Type of mattress (for example, inner spring, latex, memory foam, air mattress);
Brand or origin of the mattress;
Size of mattress (for example, king, queen, double, twin)
Price of the mattress.

PRESENTATION OF RESULTS. The results of the selection and ranking process may be displayed on a monitor, or printed, or emailed to a user, and/or stored in a computer readable memory, either on a local drive, a portable device, or in a network location. The results will clearly display the recommended mattress products including brand and model number. Graphical or photographic images of the recommended mattresses may also be presented to further identify the product being recommended. The ranked mattresses may be displayed in ascending or descending order and may be aligned on a vertical or horizontal axis. Other pertinent information associated with the recommended mattress may also be displayed, for example, mattress category, price, available options or accessories.

What is claimed is:
1. A method for displaying a recommended category of mattresses to a customer in a mattress retail environment, the recommended category selected from a set of different categories of mattresses, the method comprising:
measuring, by a two-dimensional sensor array located between the customer and a standardized reference mattress, pressure applied by the customer;
acquiring, by a computing system, a two-dimensional pressure map of the customer lying on the standardized reference mattress in the mattress retail environment by receiving signals comprising pressure data from the two-dimensional sensor array;

calculating, by the computing system, pressure related parameters from the two-dimensional pressure map, the calculated pressure related parameters including a contact area and a measure of peak pressure;

determining, by the computing system, a recommended category of mattresses for the customer based on the calculated pressure related parameters and at least on correlations of different categories of support to the contact area and correlations of different categories of comfort to the measure of peak pressure; and graphically displaying, by the computing system, the recommended category on a results display that includes a horizontal axis and a vertical axis, one of the horizontal axis and vertical axis indicating the different categories of support and the other one of the horizontal axis and vertical axis indicating the different categories of comfort;

wherein the results display orders the different categories of support according to the correlations of different categories of support to the contact area and orders the different categories of comfort according to the correlations of different categories of comfort to the measure of peak pressure.

2. The method of claim 1 wherein the set of different categories of mattresses is customizable at the mattress retail environment.

3. The method of claim 2 wherein the set of different categories of mattresses is customizable via an administration panel that is accessible at the mattress retail environment.

4. The method of claim 2 wherein the set of different categories of mattresses is customizable via a customization file that is accessible at the mattress retail environment.

5. The method of claim 1 wherein boundaries between different categories of mattresses are parallel to one of the two axes.

6. The method of claim 1 wherein the results display includes boundaries between different categories of mattresses.

7. The method of claim 1 wherein the results display does not include boundaries between different categories of mattresses.

8. The method of claim 1 wherein the mattresses include bases, and the different categories include different categories of base firmness.

9. The method of claim 1 wherein the mattresses include toppers, and the different categories include different categories of topper plushness.

10. The method of claim 1 wherein the different categories of mattresses are a separable function of two calculated pressure related parameters.

11. The method of claim 1 wherein the different categories of mattresses are a non-separable function of at least two calculated pressure related parameters.

12. The method of claim 1 wherein the step of determining a recommended category of mattresses comprises:
determining an initial recommendation based on the calculated pressure related parameters; and
changing the initial recommendation if the initial recommendation is close to a boundary between categories.

13. The method of claim 12 wherein the mattresses include bases, the different categories include different categories of base firmness, and the step of changing the initial recommendation comprises changing to a category for a firmer base if the initial recommendation is close to a boundary between categories with different base firmness.

14. The method of claim 12 wherein the mattresses include toppers, the different categories include different categories of topper plushness, and the step of changing the initial recommendation comprises changing to a category for a plusher topper if the initial recommendation is close to a boundary between categories with different topper plushness.

15. The method of claim 1 wherein the step of determining a recommended category of mattresses comprises recommending less firm mattresses for side sleepers than for back sleepers.

16. The method of claim 1 wherein one of the pressure related parameters is body type.

17. The method of claim 1 wherein the pressure related parameters comprise pressure related parameters for different body zones.

18. The method of claim 1 wherein the mattresses include toppers, the different categories include different categories of topper plushness, and the different categories of topper plushness correspond to different ranges of the measure of peak pressure.

19. The method of claim 1 wherein the pressure related parameters determine a physical profile for the customer, and the recommended category is determined based on the customer's physical profile.

20. The method of claim 19 wherein the recommended category is determined based on comparing the customer's physical profile to a database of physical profiles and corresponding mattress categories.

21. The method of claim 1 wherein the standardized reference mattress has a firmness that is unadjustable.

22. The method of claim 1, wherein the calculating the pressure related parameters comprises:
identifying a predetermined number of sensels that have highest pressure measurements among a plurality of sensels included in the two-dimensional sensor array; and
calculating the measure of peak pressure by averaging the highest pressure measurements.

23. The method of claim 1, wherein the calculating the pressure related parameters comprises:
identifying a group of sensels that have pressure measurements above a threshold among the plurality of sensels; and
calculating the contact area by aggregating an area of the group of sensels.

24. A system for displaying a recommended category of mattresses to a customer in a mattress retail environment, the recommended category selected from a set of different categories of mattresses, the system comprising:
a two-dimensional pressure sensor array configured for mounting on a standardized reference mattress at the mattress retail environment; and
a computerized system coupled to the pressure sensor, the computerized system performing the steps of:
acquiring from the pressure sensor a two-dimensional pressure map of the customer lying on the standardized reference mattress;
calculating pressure related parameters from pressure data in the acquired two-dimensional pressure map, the calculated pressure related parameters including a contact area and a measure of peak pressure;
determining a recommended category of mattresses for the customer based on the calculated pressure related parameters and at least on correlations of different categories of support to the contact area and correlations of different categories of comfort to the measure of peak pressure; and graphically displaying the recommended category on a results display that includes a horizontal axis and a vertical axis, one of the horizontal axis and vertical axis indicating the different categories of support and the other one of the horizontal axis and vertical axis indicating the different categories of comfort;

wherein the results display orders the different categories of support according to the correlation of different categories of support to the contact area and orders the different categories of comfort according to the correlation of different categories of comfort to the measure of peak pressure.

25. A system for displaying a recommended category of mattresses to a customer in a mattress retail environment, the recommended category selected from a set of different categories of mattresses, the system comprising:

a two-dimensional pressure sensor array configured for mounting on a standardized reference mattress at the mattress retail environment and for measuring pressure applied by the customer;

means for acquiring a two-dimensional pressure map of the customer lying on the standardized reference mattress in the mattress retail environment by receiving signals comprising pressure data from the two-dimensional sensor array;

means for calculating pressure related parameters from the two-dimensional pressure map, the calculated pressure related parameters including a contact area and a measure of peak pressure;

means for determining a recommended category of mattresses for the customer based on the calculated pressure related parameters and at least on correlations of different categories of support to the contact area and correlations of different categories of comfort to the measure of peak pressure; and means for graphically displaying the recommended category on a results display that includes a horizontal axis and a vertical axis, one of the horizontal axis and vertical axis indicating the different categories of support and the other one of the horizontal axis and vertical axis indicating the different categories of comfort;

wherein the results display orders the different categories of support according to the correlation of different categories of support to the contact area and orders the different categories of comfort according to the correlation of different categories of comfort to the measure of peak pressure.

26. A method for recommending mattresses from among a set of different mattresses to a customer in a mattress retail environment, the method comprising:

measuring, by a two-dimensional sensor array located between the customer and a standardized reference mattress, pressure applied by the customer;

acquiring, by a computing system, a two-dimensional pressure map of the customer lying on the standardized reference mattress located in the mattress retail environment by receiving signals comprising pressure data from the two-dimensional sensor array;

calculating, by the computing system, pressure related parameters from the two-dimensional pressure map, the calculated pressure related parameters including a contact area and a measure of peak pressure;

ranking, by the computing system, mattresses based on the calculated pressure related parameters including the contact area and the measure of peak pressure; and displaying, by the computing system, at least a portion of the mattress ranking on a results display that includes a horizontal axis and a vertical axis, one of the horizontal axis and vertical axis indicating the different categories of support and the other one of the horizontal axis and vertical axis indicating the different categories of comfort;

wherein the results display orders the displayed mattresses according to the ranking, and orders different categories of support according to different categories to the contact area and orders the different categories of comfort according to the correlation of different categories of comfort to the measure of peak pressure.

* * * * *